United States Patent [19]

Höller et al.

[11] Patent Number: 4,938,323
[45] Date of Patent: Jul. 3, 1990

[54] HYDRODYNAMIC BRAKE

[75] Inventors: Heinz Höller; Klaus Nolz; Georg Wahl, all of Crailsheim, Fed. Rep. of Germany

[73] Assignee: Voith Turbo GmbH & Co. AG, Fed. Rep. of Germany

[21] Appl. No.: 332,787

[22] Filed: Apr. 3, 1989

[30] Foreign Application Priority Data

Apr. 2, 1989 [DE] Fed. Rep. of Germany ....... 3811246

[51] Int. Cl.$^5$ ............................................. F16D 57/02
[52] U.S. Cl. ................................................... 188/296
[58] Field of Search ............... 188/290, 293, 294, 296; 192/3.21, 3.22, 3.23

[56] References Cited

U.S. PATENT DOCUMENTS

| 4,276,970 | 7/1981 | Herrmann et al. | 188/296 |
| 4,454,935 | 6/1984 | Pryor | 188/296 |
| 4,715,481 | 12/1987 | Brosius | 188/291 |
| 4,726,255 | 2/1988 | Humpfer et al. | 74/688 |

FOREIGN PATENT DOCUMENTS

| 0074857 | 9/1982 | European Pat. Off. | |
| 8714859 | 11/1987 | Fed. Rep. of Germany. | |
| 1144603 | 3/1960 | France | 188/296 |
| 282399 | 12/1970 | U.S.S.R. | 188/296 |
| 11267 | of 1911 | United Kingdom | 188/296 |

Primary Examiner—Duane A. Reger
Attorney, Agent, or Firm—Ostrolenk, Faber, Gerb & Soffen

[57] ABSTRACT

A hydrodynamic brake has a rotor blade wheel and a stator blade wheel with oblique blades and which together form a toroidal work chamber. A series of quick blades are mounted on the stator blade wheel for controlling the flow of braking fluid between the blade wheels and thereby the degree of braking action. Each of said blades is mounted for rotation around a radial axis and can be swung uniformly by means of a common actuating device. In this basic position, the guide blades are parallel to the stationary blades to provide the maximum flow of braking fluid. In a "zero position" the blades are all in a plane normal to the axis of rotation of the brake, whereby they substantially block the flow of braking fluid within the work chamber. In order to control the braking action, the guide blades may be brought into any desired intermediate position.

17 Claims, 2 Drawing Sheets

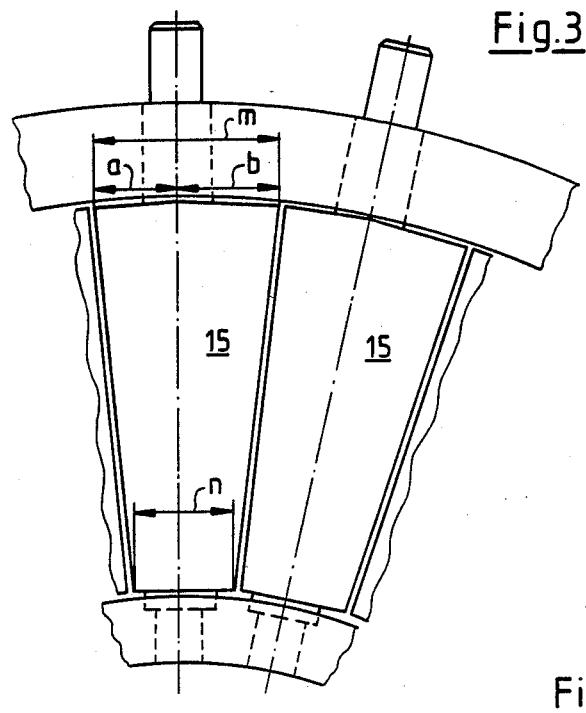
Fig. 3
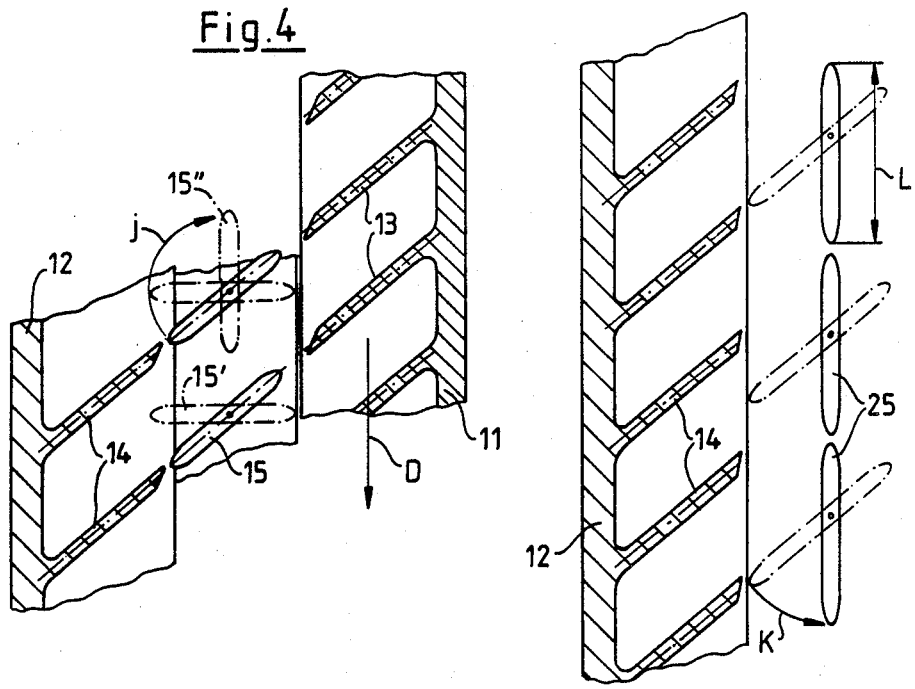
Fig. 4
Fig. 5

HYDRODYNAMIC BRAKE

BACKGROUND OF THE INVENTION

This invention relates to a hydrodynamic brake.

Known brakes of this type generally have a rotor blade wheel and a stator blade wheel which together form a toroidal work chamber; each of the two blade wheels having a series of substantially flat blades which are stationary relative to their respective blade wheel and—in order to increase the braking action—are inclined relative to the axis of rotation of the rotor blade wheel; and various devices also being known for controlling the braking action of the brake.

For example, in known hydrodynamic brakes of this type, the brake torque may be controlled by varying the degree of filling of the work chamber by the braking fluid; see, for example, German Pat. No. 28 55 654–U.S. Pat. No. 4,276,970. This and all other prior art materials mentioned herein are expressly incorporated by reference. For this purpose, the known brake is provided with control valves outside the torus-shaped work chamber, in the feed and/or discharge lines for the working liquid, said valves determining how much the work chamber is filled.

Brakes of this type have proven themselves effective, particularly as vehicle brakes. They have, among other things, the advantage that the two blade wheels have a simple shape, since each blade is stationary relative to its respective blade wheel, i.e. the blades are rigidly connected to the two wheel bodies. The cross-sectional profile of the torus-shaped work chamber is, at least approximately, of circular shape. In order to achieve the greatest possible braking action with such brakes, with a predetermined outside diameter, the blades of both blade wheels are always inclined with respect to the axial direction.

Difficulties occur, however, when such a hydrodynamic brake is to serve in a stationary power transmission unit for the sensitive braking of one of the gear members of a differential; see PCT patent application WO 86/02983—U.S. Pat. No. 4,726,255. That publication discloses that several types of such a power transmission unit are known: some types have a hydrodynamic input coupling; in another type the hydrodynamic input coupling is lacking, in which connection the driven speed of rotation of the power transmission unit can be varied by changing the brake torque of the hydrodynamic brake. In accordance with said publication, the changing of the brake torque is effected by changing the degree of filling of the hydrodynamic brake. One disadvantage of this method is that it is relatively difficult to stably maintain a given desired driven speed of rotation of the power transmission unit, or to change from a previous driven speed of rotation to another driven speed of rotation.

SUMMARY OF THE INVENTION

It is therefore the general object of the invention further to develop the type of hydrodynamic brake defined hereinabove and having oblique blades, in such a manner that the braking action (which may be referred to as the "specific performance") can be set with greater precision than previously and, furthermore, with the smallest possible hysteresis.

A more specific object is to provide a hydrodynamic brake wherein different rotor speeds can be maintained in a stable manner, and in which one can change, if necessary, from one given rotor speed to another within the shortest possible time. Such a brake should also be as inexpensive as possible.

These objects are achieved by a brake having the features disclosed and claimed herein. Such a hydrodynamic brake may have a rim-like assembly comprising a series of additional blades ("guide blades"), each of which is mounted for rotation around a radial axis, between the two blade wheels, and specifically in the region of the central plane of the brake, which is normal to the axis of rotation. The guide blades may be mounted fixed with respect to one of the two blade wheels, preferably the stator wheel, and may be rotated by a common actuating device. The guide blades may be rotated into a basic position, in which the guide blades have substantially the same inclination as the stationary blades, when maximum specific performance is required; and one or more other positions, differing from the basic position, corresponding to a lower degree of specific performance.

Advantageously, the brake of the invention may have a series of movable guide blades disposed generally in the central plane of the brake, between the two brake wheels, for controlling the flow of the stream of working liquid, preferably as the stream passes from the rotor into the stator. To be sure, the construction according to the invention is mechanically somewhat more expensive than the known hydrodynamic brakes without adjustable guide blades. It has, however, been found that, for instance, when the hydrodynamic blade of the invention is used in a power transmission unit of the type described above, substantial advantages can be obtained in other respects: the hydrodynamic brake in accordance with the invention can be operated permanently, or at least predominantly, with the work chamber filled 100 percent. Thus, the expensive control systems for adjusting the degree of filling that were previously required can, as a rule, be dispensed with.

To be sure, an external working liquid cycle should nevertheless be provided. That is, in order to discharge heat, working liquid flows continuously from the outside into the work chamber and is removed again continuously. In this external cycle, devices should also be provided for completely emptying the hydrodynamic brake, in the event that the rotor blade wheel of the brake at times rotates without braking action being demanded. It is, furthermore, also possible to provide a control device for adjusting the degree of filling in addition to the movable guide blades.

With the adjustable guide blades of the invention, the result is obtained that a given rotor speed can be maintained constant with a high degree of certainty. More specifically, it has been found that the parabolic characteristic curves (torque vs. speed of rotation), resulting with different guide blade positions are very clearly distinguished from each other, i.e., there are obtained well-staggered, stable performance characteristics with low hysteresis. It has furthermore been found that the brake reacts much faster to a change in the angle of attack of the guide blades than to a change in the degree of filling, for example, if one wishes to set a different rotor speed.

In principle, the adjustable guide blades in accordance with the invention can be arranged on either the stator or the rotor blade wheel. Arrangement of the guide blades on the stator blade wheel is, however, preferred since it is of simpler construction.

The range of adjustment of the guide blades in accordance with the invention can be so large, without significant additional expense, that the guide blades can be brought into a "zero position" substantially parallel to the axially normal central plane. In this case, they so strongly block the passage of the working liquid from the rotor into the stator and vice versa, that a considerable reduction in the braking action occurs. Advantageously one may utilize this effect, in particular, when it is desired, by emptying the work chamber, to have the braking action approach as close as possible to zero.

A hydrodynamic brake with adjustable guide blades is, to be sure, already known from FIG. 1 of German Unexamined Application for Pat. No. OS 15 75 994. These blades' axis of swing, however, extends parallel to the axis of rotation, so that this construction can only be employed when the blades of both blade wheels extend parallel to the axis of rotation. In this case, however, the maximum braking action is entirely unsatisfactory, so that this known arrangement is eliminated for use in actual practice.

The same is true of the known arrangement in accordance with German Unexamined Application for Pat. No. OS 17 50 272. In that case, all the blades of one of the two blade wheels can be swung out of the usual oblique position into a position parallel to the plane of the normal axis. This merely results in reducing the braking action in shut-off condition. A continuous control of the braking action during normal braking operation is not contemplated there; it would, furthermore, not be effective at all since—as already mentioned—all the blades of one of the two blade wheels are swung. As a result, the braking action collapses abruptly as soon as the blades are moved out of the usual oblique position.

FIG. 3 of German Pat. No. 621 413 shows a hydrodynamic coupling with a core ring and a rim of adjustable guide blades which extend in radial direction from the outer edge of the work chamber profile to the core ring. The blade wheel, in which these adjustable guide blades are arranged, is rotatable relative to its shaft when a given torque is exceeded. If such a rotation of the blade wheel with respect to the shaft takes place, the guide blades are rotated by means of an adjustment device out of their normal position (in which they are parallel to the nondisplaceable blades) to such an extent that they block the flow cycle, in part or entirely. The purpose of this known arrangement, therefore, is an automatic limiting of the transferable torque. The setting of any desired intermediate positions of the guide blades is not possible and the stable maintenance of a given speed of rotation is thus also not possible.

If adjustable guide blades similar to FIG. 3 of German Pat. No. 621 413 were provided in a hydrodynamic brake with oblique blades and a core ring, this would, with the same outer dimensions, lead to unsatisfactory values with regard to the maximum braking action. Furthermore, the shape and staggering of the parabolic characteristic curves (torque vs. speed of rotation) would be unsatisfactory. By comparison, substantially better results can be obtained when the work chamber in the brake according to the invention has no such core and when the rotatable guide blades extend in the radial direction from the outer edge to the inner edge of the work chamber profile.

It is, in this case, characteristic of the brake in accordance with the invention that the working liquid passes through the blade channels between the guide blades, in one direction in the radially outer region, and in the other direction in the radially inner region.

Further advantages and features of the invention will be explained with reference to the illustrative examples shown in the drawings.

BRIEF DESCRIPTION OF THE DRAWINGS

FIG. 3 is a partial cross-section taken in the direction of the arrow III in FIG. 2;

FIG. 4 is a partial cross-section taken along line IV—IV in FIG. 2; and

FIG. 5 is a cross-sectional view similar to FIG. 4 but according to a modified embodiment of the invention.

DESCRIPTION OF THE PREFERRED EMBODIMENTS

Figure 1:
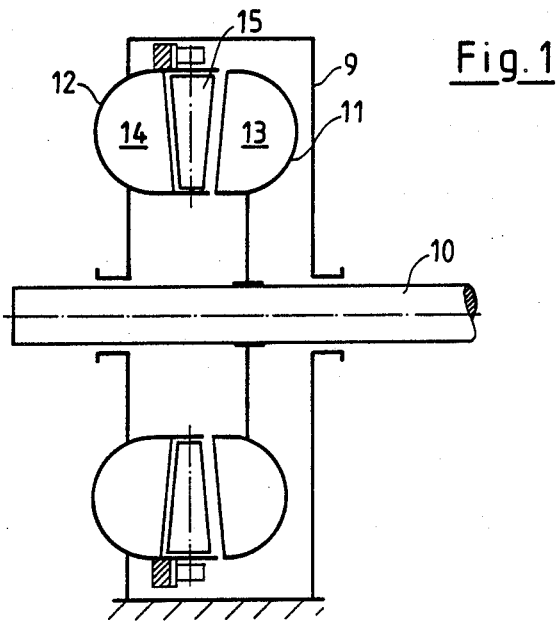
FIG. 1 is a simplified schematic longitudinal cross-section of a first embodiment of a hydrodynamic brake according to the invention.

The hydrodynamic brake shown in FIG. 1 has a rotor blade wheel 11 and a stator wheel 12 which together form a torus-shaped work chamber. The rotor blade wheel 11 is firmly seated on the shaft 10, which is to be braked, and which is rotatably mounted in a fixed brake housing 9. The stator blade wheel 12 is part of the brake housing 9. The blades 13 and 14 of the two blade wheels 11 and 12 are cast in the blade wheel bodies and, according to FIG. 4, with an orientation oblique to the axis of rotation (the longitudinal axis of the shaft 10). The braking direction of rotation of the blade wheel 11 is designated D.

As seen in FIG. 1, the torus-shaped work chamber is oval in cross-section, the longitudinal axis of the oval being parallel to the axis of rotation. In other words, compared to known hydrodynamic brakes wherein the work chamber has a circular cross-section, the blade wheels are somewhat removed from each other. This structure elongates the work chamber, and makes room for a series of movable guide blades 15 to be arranged between the two blade wheels.

It is, however, also possible as an alternative embodiment, to provide such a series of guide blades while retaining the circular cross-section of the work chamber.

The guide blades 15 are mounted rotatably around respective radial axes which are mounted fixed to the stator blade wheel 12. For this purpose, each guide blade 15 has, according to FIG. 2, one inner journal pin 16 and one outer journal pin 17. The latter extends beyond the radially outer wall of the stator blade wheel 12. A pinion 18 is mounted fixed to the radially outer end of each outer journal pin 17. A gear rim 19, which is coaxial to the axis of rotation of the brake, meshes with all the pinions 18, so that all the guide blades 15 can be adjusted simultaneously by rotating the gear rim 19. The brake housing 9 and the shaft 10, on which the rotor blade wheel 11 is seated, have been omitted in FIG. 2.

Figure 2:
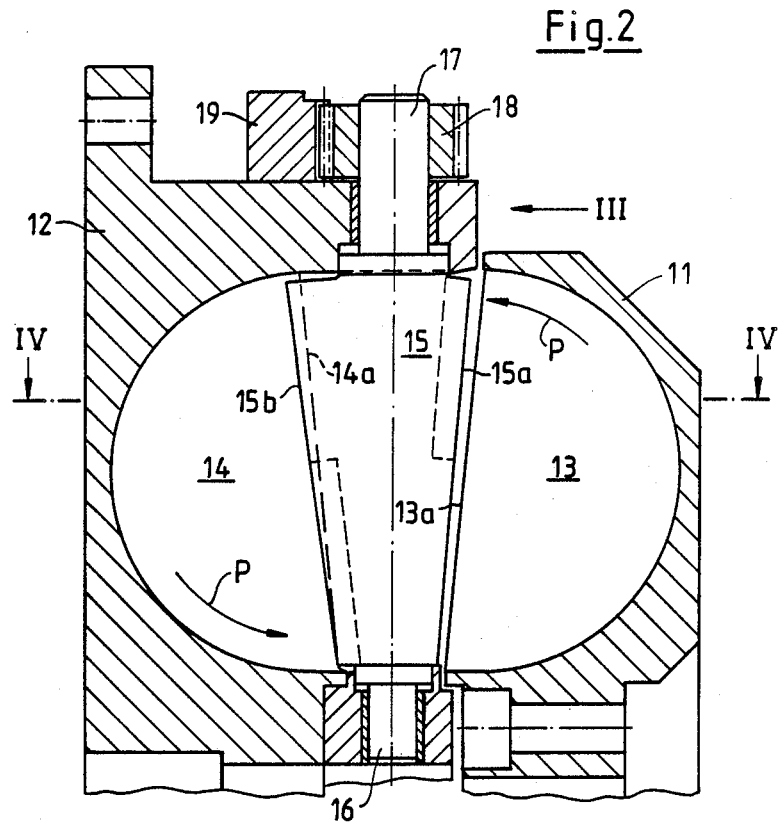
FIG. 2 is a partial longitudinal cross-section corresponding to FIG. 1, but on a larger scale.

As alternatives to the embodiment shown in FIG. 2, pinion 18 and gear rim 19 can be formed as bevel gears. Also, the pinions 18 and gear rim 19 can be replaced by adjusting levers, or the like.

In FIG. 4 the guide blades 15 have been shown by solid lines in their basic position, in which they extend substantially parallel to the oblique blades 13 (of the rotor blade wheel 11) and the oblique blades 14 (of the stator blade wheel 12). Maximum braking action can be achieved with this position of the guide blade 15. The guide blades 15 are also arranged in this embodiment so that in their basic position they are each aligned with a respective one of the stator blades 14. In this case the guide blades 15, in their basic position, are essentially an extension of the stator blades 14. If one wishes to reduce the braking action so that a higher speed of the shaft 10 is established, the guide blades 15, as shown in FIG. 4 by dash-dot lines and designated 15', are swung in clockwise direction until they extend, for instance, parallel to the axis of rotation. The guide blades 15 have also been shown in this position in FIG. 2. When required, the guide blades 15, again as shown in FIG. 4, can be swung still further in a clockwise direction until they finally assume the so-called zero position which is designated 15" in FIG. 4. In this case, all blades are disposed in the same plane, parallel to the central plane of the hydrodynamic brake, which central plane is normal to the longitudinal axis of rotation of the brake.

As can be noted from FIG. 3, which is a view of the guide blades 15 in the axial direction, the guide blades in their zero position cover the entire work chamber—aside from small remaining gaps—so that the normal toroidal flow of the work liquid (or of the air in the case of an emptied brake) is prevented. In order to achieve this effect as completely as possible, each guide blade 15 is keystone-shaped, i.e., longer on the outer edge of the work chamber profile than on the inner edge. In FIG. 3, dimension m is larger than dimension n.

It is, however, advisable in this connection to make the guide blade 15 asymmetrical. That is, proceeding from the axis of swing and viewed in the basic position, the length a of the blade part pointed toward the rotor blades 13 is smaller than the length b of the blade part pointed toward the stator blades 14. This measure succeeds in reducing the force required for the adjusting of the guide blades 15—or that required to hold the guide blades in a given position in stable manner—to substantially below the value which would be required when using symmetrical guide blades.

As can be noted, in particular, from FIG. 2, the edges 13a and 14a of the rotor blades 13 and the stator blades 14 extend obliquely, with respect to the radial direction, so that they lie in a theoretical conical surface. The blades 13 and 14 are thus adapted to the different width dimensions m and n at the two ends of the guide blades 15. The cross-sectional part of the work chamber which is taken up by the rotor blades 13 is, in rough approximation, a semicircle. The same is true of the cross-sectional part of the work chamber which is taken up by the stator blades 14.

Also in the embodiment of FIG. 4 (but not required for the invention), the distance between each two rotor blades 13 is equal to the distance between each two stator blades 14. The number of rotor blades 13 is thus equal to the number of stator blades 14. This is also true of the embodiment according to FIG. 5; but in FIG. 5 the rotor blade wheel 11 has been omitted.

In FIG. 4, the number of guide blades 15 is also equal to the number of stator blades 14. FIG. 5, however, is different: in this case, the number of guide blades 25 is only ⅔ of the number of stator blades 14. The length L of the guide blades 25 is correspondingly greater, so that they can again, as in FIG. 3, cover the entire work chamber.

FIG. 5 shows the guide blades 25 in solid lines in zero position and in dash-dot lines in their basic position, in which they are parallel to the stator blades 14. The guide blades 25 have been swung counter-clockwise from the basic position into the zero position. Stated more generally: the guide blades have been swung counter-clockwise over a relatively shorter path (direction of swing k) from the basic position into the zero position. This aspect can be utilized when it is important to reduce the braking action as rapidly as possible to the smallest possible value. The other (clockwise) direction of swing i (FIG. 4) which utilizes the longer path, will be preferred when it is important to set a given rotor speed as accurately as possible and to keep it constant The guide blades 15 are, in this case, held in some intermediate position, for instance, 15'.

In accordance with FIG. 5, every second guide blade 25 is aligned in the basic position with one of the stator blades 14; one can, however, also deviate from this.

In accordance with both FIGS. 4 and 5, points are formed in both blade edges of the guide blades 15 or 25, as the case may be, in an approximately symmetrical manner. However, it is also possible to have an asymmetrical taper, for example unilateral, of the blade edges. Such is the shape of the rotor blades 13 and the stator blades 14. It may be sufficient, differing from FIGS. 4 and 5, for only the edge of each guide blade 15 facing the rotor blade wheel 11 to be pointed, and for the other edge facing the stator blade wheel 12 to be left blunt.

Another variant is indicated in FIG. 2. In that case, the blade edge 15a, which is located on the side of the rotor blade wheel 11, is pointed only in its radially outer region (toward the top of FIG. 2). On the other hand, the blade edge facing the stator blades 14 is pointed only in its radially inner region. In other words, as indicated by dashed lines on the guide blade 15 in FIG. 2, only those regions 15a and 15b of the blade edges 15 are pointed, which are in opposition to the fluid flow (arrows P) during braking.

Although the invention has been described herein with respect to particular embodiments thereof, the appended claims are not so limited, but are to be considered to include any modifications and variations that may occur to one of ordinary skill in the art which are within the teachings set forth herein.

What is claimed is:

1. A hydrodynamic brake comprising:
   a rotor blade wheel and a stator blade wheel defining a common longitudinal axis and together forming a toroidal work chamber, said blade wheels providing a braking action due to a flow of braking fluid within said work chamber;
   each said blade wheel having a series of substantially flat blades in said work chamber, each said blade being mounted radially and stationary with respect to its corresponding blade wheel and said blades being angled with respect to said longitudinal axis; and
   control means for controlling the flow of braking fluid between said blade wheels within said work chamber and thereby controlling the braking action of the brake.

2. A hydrodynamic brake comprising:
   a rotor blade wheel and a stator blade wheel defining a common longitudinal axis and together forming a toroidal work chamber, said blade wheels providing a braking action due to a flow of braking fluid within said work chamber;

each said blade wheel having a series of substantially flat blades in said work chamber, each said blade being mounted radially and stationary with respect to its corresponding blade wheel and said blades being angled with respect to said longitudinal axis; and control means for controlling the flow of braking fluid between said blade wheels within said work chamber and thereby controlling the braking action of the brake;

wherein said control means comprises:

a series of guide blades disposed between the blade wheels generally in a central plane of the brake which is normal to the longitudinal axis, each said guide blade being mounted for rotation about a radial axis which intersects said longitudinal axis; and actuating means for commonly rotating said guide blades to a predetermined angle with respect to said longitudinal axis.

3. A brake is in claim 2, wherein said guide blades are rotatable by said actuating means into a basic position in which they are substantially parallel to the rotor blades and stator blades, wherein the brake provides a greater braking action, and also into another position wherein the brake provides a lesser braking action.

4. A brake as in claim 3, wherein said guide blades are rotatable by said actuating means into a position substantially parallel to said longitudinal axis in which an intermediate degree of braking action is provided; and into a zero position substantially normal to said longitudinal axis in which said guide blades substantially block said flow of braking fluid between said rotor blades and stator blades and a minimum braking action is provided.

5. A brake as in claim 2, wherein the guide blades are mounted on respective shafts mounted fixed to the stator blade wheel.

6. A brake as in claim 2, wherein the work chamber has no core ring and the rotatable guide blades extend in radial direction from the outer part to the inner part of the work chamber profile.

7. A brake as in claim 6, wherein a length (m) of the guide blades measured at the outer part of the work chamber profile is greater than a length (n) measured at the inner part, whereby in a zero-position substantially perpendicular to the longitudinal axis, the guide blades are capable of substantially isolating from each other the two work chamber halves corresponding to the two blade wheels.

8. A brake as in claim 7, wherein the edges of the blades of the two blade wheels opposite the guide blades extend obliquely with respect to the radial direction, corresponding to the approximately trapezoidal shape of the guide blades, whereby the blade edges of both blade wheels lie in respective theoretical conical surfaces.

9. A brake as in claim 2, wherein the cross-sectional profile of the toroidal work chamber has an oval shape, said oval shape having a longitudinal axis extending substantially parallel to the axis of rotation.

10. A brake as in claim 2, wherein the cross-sectional profile of the toroidal work chamber is substantially circular.

11. A brake as in claim 2, wherein the number of guide blades is equal to the number of blades in at least one of the two blade wheels.

12. A brake as in claim 2, wherein the number of guide blades is smaller than the number of blades in at least on of the blade wheels.

13. A brake as in claim 12, wherein the number of guide blades is two-thirds the number of blades in at least one of the blade wheels.

14. A brake as in claim 2, wherein each guide blade comprises a plate of substantially constant thickness.

15. A brake as in claim 14, wherein at least selected regions of the blade edges of the guide blades which face the oncoming flow, have a pointed edge.

16. A brake as in claim 14, wherein the blade edge of each guide blade which faces the rotor blade wheel is pointed.

17. A brake as in claim 2, wherein a length (a) of a portion of each guide blade defined between the guide blade axis and the guide blade edge facing the rotor blades is smaller than a length (b) of another portion of each guide blade defined between the guide blade axis and the guide blade edge facing the stator blades.

* * * * *